US010350766B2

(12) United States Patent
Abdallah et al.

(10) Patent No.: US 10,350,766 B2
(45) Date of Patent: Jul. 16, 2019

(54) EXTENDED-REACH ASSIST DEVICE FOR PERFORMING ASSEMBLY TASKS

(71) Applicants: GM GLOBAL TECHNOLOGY OPERATIONS LLC, Detroit, MI (US); Universite Laval, Quebec (CA)

(72) Inventors: Muhammad E. Abdallah, Rochester Hills, MI (US); Christa Lynn Lauder, Windsor (CA); Clement Gosselin, Quebec (CA)

(73) Assignees: GM Global Technology Operations LLC, Detroit, MI (US); Universite Laval, Quebec (CA)

( * ) Notice: Subject to any disclaimer, the term of this patent is extended or adjusted under 35 U.S.C. 154(b) by 0 days.

(21) Appl. No.: 15/219,459

(22) Filed: Jul. 26, 2016

(65) Prior Publication Data

US 2017/0080576 A1 Mar. 23, 2017

Related U.S. Application Data

(60) Provisional application No. 62/221,305, filed on Sep. 21, 2015.

(51) Int. Cl.
*B25J 13/00* (2006.01)
*B25J 13/08* (2006.01)
(Continued)

(52) U.S. Cl.
CPC .......... *B25J 13/085* (2013.01); *B25J 9/0051* (2013.01); *B25J 9/1015* (2013.01); *B25J 17/0208* (2013.01); *B25J 17/0216* (2013.01)

(58) Field of Classification Search
CPC combination set(s) only.
See application file for complete search history.

(56) References Cited

U.S. PATENT DOCUMENTS

| 4,894,908 | A | * | 1/1990 | Haba, Jr. | ............... B23P 21/004 29/711 |
| 4,937,759 | A | * | 6/1990 | Vold | ....................... B25J 9/1602 700/262 |
| 4,979,949 | A | * | 12/1990 | Matsen, III | ............ A61B 17/15 606/53 |
| 5,010,773 | A | * | 4/1991 | Lorenz | ................... B25J 13/084 310/319 |

(Continued)

FOREIGN PATENT DOCUMENTS

| CN | 201073767 Y | 6/2008 |
| CN | 102292194 A | 12/2011 |

(Continued)

*Primary Examiner* — Jonathan L Sample
(74) *Attorney, Agent, or Firm* — Quinn IP Law

(57) ABSTRACT

An extended-reach assist device for an assembly task includes a base mechanism and a compliant end-effector. The articulated base mechanism provides one or more passive degrees of freedom. The end-effector is connected to the base mechanism, and has one or more active or passive degrees of freedom collectively configured to react to contact forces with the assist device when completing the dexterous assembly task. A weight of the end-effector is supported by the base mechanism. The end-effector may be optionally configured as a passive device configured to produce a remote center of compliance or as a robot mechanism. A mechanism may actively or passively augment a force applied by the operator. A sensor may detect a signature indicative of successful task completion, e.g., an acoustic, visual, or audio sensor.

19 Claims, 3 Drawing Sheets

(51) Int. Cl.
  *B25J 9/00*  (2006.01)
  *B25J 9/10*  (2006.01)
  *B25J 17/02* (2006.01)

(56) References Cited

U.S. PATENT DOCUMENTS

| | | | | |
|---|---|---|---|---|
| 5,031,304 A * | 7/1991 | Shepard | B23P 19/102 | 29/700 |
| 5,056,038 A * | 10/1991 | Kuno | B25J 9/1633 | 700/260 |
| 5,086,401 A * | 2/1992 | Glassman | B25J 9/1679 | 700/259 |
| 5,130,632 A * | 7/1992 | Ezawa | B25J 9/1633 | 318/568.11 |
| 5,201,772 A * | 4/1993 | Maxwell | A61F 5/0102 | 434/258 |
| 5,261,266 A * | 11/1993 | Lorenz | B25J 13/084 | 73/1.15 |
| 5,294,873 A * | 3/1994 | Seraji | B25J 9/1638 | 318/561 |
| 5,331,266 A * | 7/1994 | Widmann | B25J 9/12 | 318/13 |
| 5,341,459 A * | 8/1994 | Backes | B25J 9/1661 | 700/260 |
| 5,644,204 A * | 7/1997 | Nagle | B62D 57/032 | 318/568.12 |
| 5,767,648 A * | 6/1998 | Morel | B25J 9/1628 | 318/568.1 |
| 5,816,105 A * | 10/1998 | Adelstein | B25J 9/106 | 74/471 XY |
| 5,828,197 A * | 10/1998 | Martin | B25J 9/1689 | 318/567 |
| 5,952,796 A * | 9/1999 | Colgate | B25J 9/1656 | 318/1 |
| 5,994,864 A * | 11/1999 | Inoue | B25J 9/1633 | 318/568.2 |
| 6,088,020 A * | 7/2000 | Mor | G06F 3/016 | 318/628 |
| 6,339,969 B1 * | 1/2002 | Salcudean | B25J 9/106 | 74/490.01 |
| 6,786,896 B1 * | 9/2004 | Madhani | B25J 9/1615 | 606/1 |
| 7,145,306 B2 * | 12/2006 | Aihara | B25J 9/1602 | 318/568.12 |
| 7,327,348 B2 * | 2/2008 | Goldenberg | G05G 1/02 | 318/568.11 |
| 7,920,124 B2 * | 4/2011 | Tokita | G06F 3/011 | 345/156 |
| 8,050,780 B2 * | 11/2011 | Tessier | B64C 13/04 | 244/229 |
| 8,650,965 B2 * | 2/2014 | Hashiguchi | B25J 9/0087 | 73/763 |
| 8,805,584 B2 * | 8/2014 | Yamane | B62D 57/032 | 700/245 |
| 9,060,884 B2 * | 6/2015 | Langlois | A61F 2/68 | |
| 9,308,645 B2 * | 4/2016 | Lecours | B25J 9/163 | |
| 9,475,198 B2 * | 10/2016 | Mishra | B25J 15/0466 | |
| 9,505,132 B1 * | 11/2016 | Bingham | B25J 9/1692 | |
| 9,687,982 B1 * | 6/2017 | Jules | B25J 9/1612 | |
| 2002/0062177 A1 * | 5/2002 | Hannaford | B25J 9/1689 | 700/245 |
| 2005/0159840 A1 * | 7/2005 | Lin | B23P 6/002 | 700/245 |
| 2005/0230557 A1 * | 10/2005 | Aghili | B64G 7/00 | 244/158.1 |
| 2006/0004489 A1 * | 1/2006 | Weiss | B25J 9/1602 | 700/245 |
| 2006/0071622 A1 * | 4/2006 | Townsend | B25J 9/1612 | 318/400.31 |
| 2006/0218680 A1 * | 9/2006 | Bailey, III | B08B 1/00 | 414/217 |
| 2007/0010898 A1 * | 1/2007 | Hosek | G05B 19/4148 | 700/2 |
| 2007/0067678 A1 * | 3/2007 | Hosek | G05B 23/0235 | 714/25 |
| 2007/0073442 A1 * | 3/2007 | Aghili | B25J 9/1605 | 700/245 |
| 2007/0151390 A1 * | 7/2007 | Blumenkranz | B25J 15/0009 | 74/490.06 |
| 2008/0231221 A1 * | 9/2008 | Ogawa | B25J 5/007 | 318/568.12 |
| 2009/0024142 A1 * | 1/2009 | Ruiz Morales | B25J 9/041 | 606/130 |
| 2009/0259412 A1 * | 10/2009 | Brogardh | B25J 9/1633 | 702/41 |
| 2010/0094312 A1 * | 4/2010 | Ruiz Morales | B25J 13/085 | 606/130 |
| 2010/0113980 A1 * | 5/2010 | Herr | A61F 2/60 | 600/587 |
| 2010/0114329 A1 * | 5/2010 | Casler | B25J 19/0008 | 623/24 |
| 2010/0138038 A1 * | 6/2010 | Moon | B25J 9/1674 | 700/245 |
| 2010/0234996 A1 * | 9/2010 | Schreiber | B25J 13/085 | 700/258 |
| 2010/0243344 A1 * | 9/2010 | Wyrobek | B25J 5/007 | 180/21 |
| 2010/0300230 A1 * | 12/2010 | Helmer | B25J 9/106 | 74/469 |
| 2011/0071679 A1 * | 3/2011 | Barajas | B25J 9/1674 | 700/259 |
| 2011/0082566 A1 * | 4/2011 | Herr | A61F 2/60 | 623/24 |
| 2011/0126660 A1 * | 6/2011 | Lauzier | B25J 17/0208 | 74/490.05 |
| 2011/0130879 A1 * | 6/2011 | Abdallah | B25J 9/1615 | 700/260 |
| 2011/0190932 A1 | 8/2011 | Tsusaka et al. | | |
| 2011/0218676 A1 * | 9/2011 | Okazaki | B25J 9/1075 | 700/260 |
| 2011/0264109 A1 * | 10/2011 | Nowlin | B25J 9/1682 | 606/130 |
| 2012/0010749 A1 * | 1/2012 | van der Merwe | A61F 2/54 | 700/264 |
| 2012/0053726 A1 * | 3/2012 | Peters | E04G 21/22 | 700/252 |
| 2013/0245824 A1 * | 9/2013 | Barajas | B25J 9/1664 | 700/253 |
| 2013/0310979 A1 * | 11/2013 | Herr | B62D 57/032 | 700/258 |
| 2014/0067124 A1 * | 3/2014 | Williamson | G05B 19/406 | 700/258 |
| 2014/0107843 A1 * | 4/2014 | Okazaki | B25J 13/085 | 700/260 |
| 2014/0201571 A1 * | 7/2014 | Hosek | G06F 11/2257 | 714/26 |
| 2014/0246257 A1 * | 9/2014 | Jacobsen | B62D 37/04 | 180/14.2 |
| 2014/0330432 A1 * | 11/2014 | Simaan | B25J 9/1633 | 700/250 |
| 2015/0105905 A1 * | 4/2015 | Nishida | B25J 9/1641 | 700/254 |
| 2015/0168496 A1 * | 6/2015 | Moura | G01L 3/22 | 702/182 |
| 2015/0209961 A1 * | 7/2015 | Komatsu | B25J 9/1676 | 700/255 |
| 2015/0323398 A1 * | 11/2015 | Lauzier | B25J 9/0081 | 73/862.08 |
| 2016/0039093 A1 * | 2/2016 | Abdallah | B25J 9/1687 | 700/257 |
| 2016/0059412 A1 * | 3/2016 | Oleynik | B25J 9/163 | 700/257 |

FOREIGN PATENT DOCUMENTS

| | | |
|---|---|---|
| CN | 103640022 A | 3/2014 |
| CN | 103919591 A | 7/2014 |
| CN | 104622573 A | 5/2015 |
| CN | 104783900 A | 7/2015 |

(56) References Cited

FOREIGN PATENT DOCUMENTS

| | | |
|---|---|---|
| DE | 202010008722 U1 | 1/2012 |
| DE | 102011084007 A1 | 4/2012 |
| DE | 102013204789 A1 | 9/2013 |
| WO | 9950721 A1 | 10/1999 |

* cited by examiner

EXTENDED-REACH ASSIST DEVICE FOR PERFORMING ASSEMBLY TASKS

CROSS-REFERENCE TO RELATED APPLICATIONS

This application claims the benefit of U.S. Provisional Application No. 62/221,305, filed Sep. 21, 2015, which is hereby incorporated by reference in its entirety.

TECHNICAL FIELD

The present disclosure relates to an extended-reach assist device for performing assembly tasks.

BACKGROUND

A human operator performing assembly tasks may be required to bend over and reach into a work area. For instance, an operator may be required to reach into an open compartment to locate and fasten a hose clamp or position a peg within a mating hole. Likewise, trim pieces may have to be manually located, aligned, and snapped into place. The need to bend over and/or reach when performing certain assembly tasks on a work piece can present ergonomic challenges to the operator over time. In addition, the need to apply forces at such distances can increase ergonomic stressors on the operator. To minimize the ergonomic impact, it is also common for manufacturers to adjust the design of an assembly, such as by placing components at suboptimal locations.

SUMMARY

An extended-reach assist device is disclosed herein for assisting a human operator in the performance of an assembly task, such as a task performed beyond the operator's immediate reach that requires some level of manipulation using the operator's hands or fingers. Such tasks may be conducted in the assembly of systems such as vehicles, appliances, furniture, power equipment, and the like. Gross motion required by the assembly task is performed by the operator using the extended-reach assist device, with a compliant end-effector of the device performing dexterous or fine movement portions of the task, such as locating and placing a peg in a hole. As set forth below, the extended-reach assist device may include force augmentation functionality such that an operator-applied force is automatically increased, thereby facilitating assembly and improving overall ergonomics in the performance of the task. Sensory feedback may also be used to automatically verify proper performance of the task.

The extended-reach assist device generally consists of two mechanisms connected in series, i.e., an articulated base mechanism and a compliant end-effector. The articulated base mechanism, which has one or more control degrees of freedom (DOF) that the operator can passively manipulate, may support the weight of the end-effector and allow the operator to grossly position the end-effector beyond the operator's normal unassisted reach. The articulated base mechanism also allows the operator to grossly position the end-effector without the operator supporting the end-effector's weight. The end-effector has one or more actively or passively compliant DOF. That is, the control DOF provided by the end-effector may be passively-controlled or actively-controlled, with active control referring to automatic control via an actuator and passive control referring to an absence of such powered actuation, as is well known in the art. The DOF of the end-effector are collectively configured to react to any contact forces from an external object or surface acting on the device during the performance of the task, thus enabling the fine manipulation functionality needed for completing the task.

In a possible embodiment, the extended-reach assist device includes an articulated base mechanism and an end-effector. The articulated base mechanism includes an articulated mechanism, such as but not limited to interconnected links or arm segments providing at least one passive degree of freedom. The end-effector, which is connected to the articulated base mechanism, has one or more actively or passively compliant DOF. The DOF of the end-effector are collectively configured to react to contact forces when completing the assembly task.

The end-effector may be configured to produce a remote center of compliance providing the passively compliant degrees of freedom of the end-effector. Alternatively, the end-effector may be an actively-controlled serial or parallel robot mechanism providing actively-compliant degrees of freedom via operation of a control module.

A force sensor may be used that is operable for detecting an applied force to the end-effector. In such an embodiment, a force augmentation mechanism may be used to augment the detected applied force. The mechanism may operate with or without the force sensor, e.g., as an active actuator or a passive device such as a loaded spring.

A bracing device may brace the end-effector against an external surface to facilitate augmentation of the applied force, as well as provide improved positioning accuracy. Alternatively, the augmented force may be provided as impulsive forces, i.e., forces provided through moving inertia after a transient force event. By way of illustration, an impact wrench or a nail gun are examples of tools that can provide such impulsive forces.

The extended-reach assist device may include a signature sensor operable for detecting a signature indicative of a successful completion of the dexterous assembly task, and an indicator device in communication with the signature sensor that is operable for indicating the successful completion of the task. The signature may be detected through algorithms or logic operating on the sensor data. Example sensors include tactile, visual, and/or audio sensors, any or all of which may be used in different embodiments. In this manner, the disclosed device may be used in error-proofing of assembly tasks in various industries.

The articulated base mechanism may include a positioning system that maintains a position of the articulated base mechanism, e.g., along a longitudinal axis of a link of the articulated base mechanism. The positioning system may include a weight support system such as a weighted counterbalance system, springs, or pneumatics.

In another possible embodiment, the extended-reach assist device includes an articulated base mechanism and an end-effector. The articulated base mechanism in this particular embodiment provides one or more passively-controlled DOF, and has a link in the form of an elongated member having a first axis, a first arm segment having first and second distal ends, and a second arm segment. The first distal end of the first arm segment is rotatable and translatable with respect to the first axis. The second arm segment, which is connected to the second distal end of the first arm segment, is rotatable about a second axis that is parallel to the first axis. The end-effector, which is positioned at a distal end of one of the additional arm segments, has one or more passively-controlled or actively-controlled DOF. The assist device thus provides two or more total control DOF for performing the dexterous assembly task.

The above and other features and advantages of the present disclosure will be readily apparent from the following detailed description of the embodiment(s) and best mode(s) for carrying out the disclosure when taken in connection with the accompanying drawings and appended claims.

DETAILED DESCRIPTION

Figure 1:
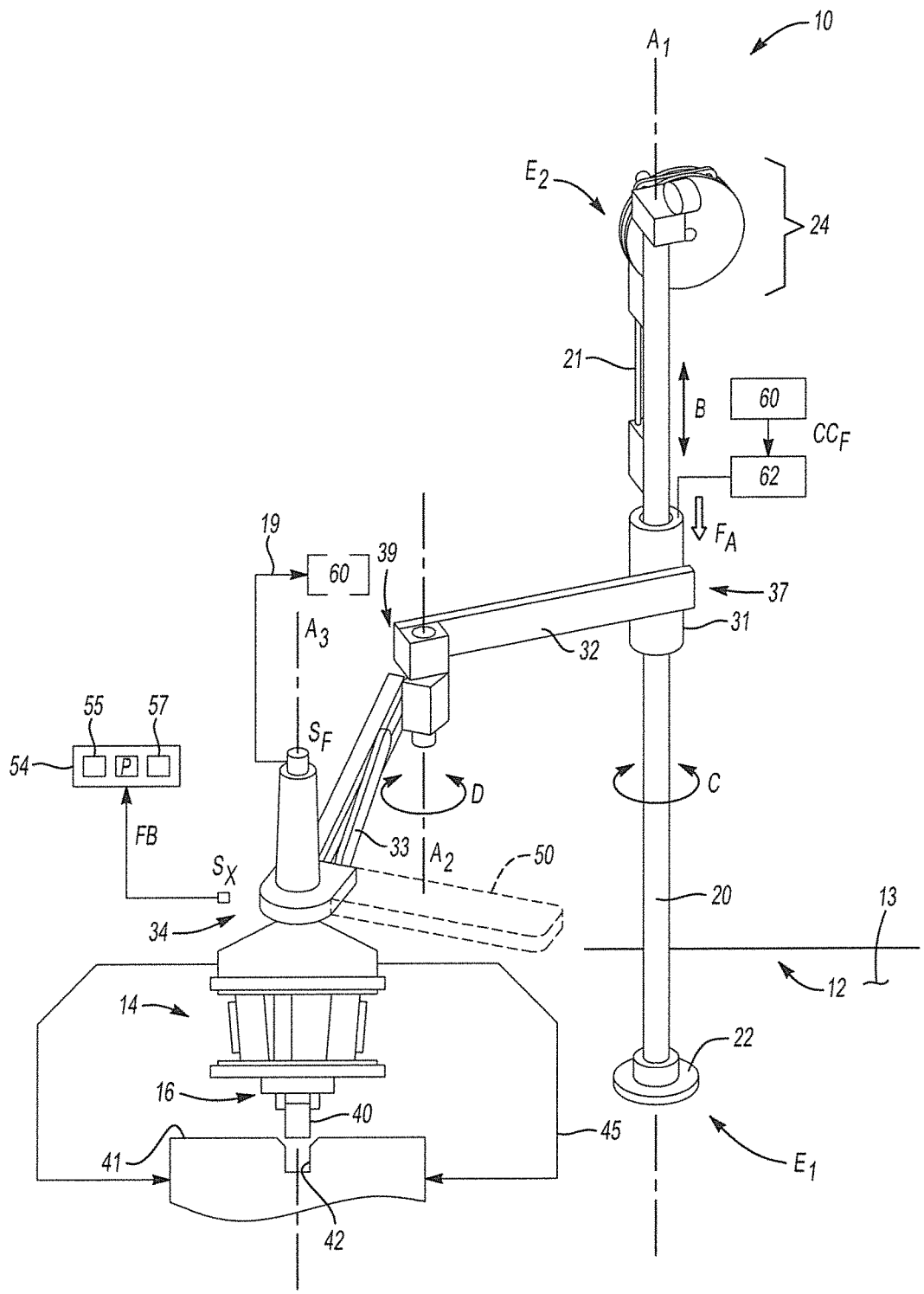
FIG. 1 is a schematic perspective side view illustration of an extended-reach assist device for a dexterous assembly task in which a compliant end-effector includes a passively-compliant mechanism.
Figure 2:
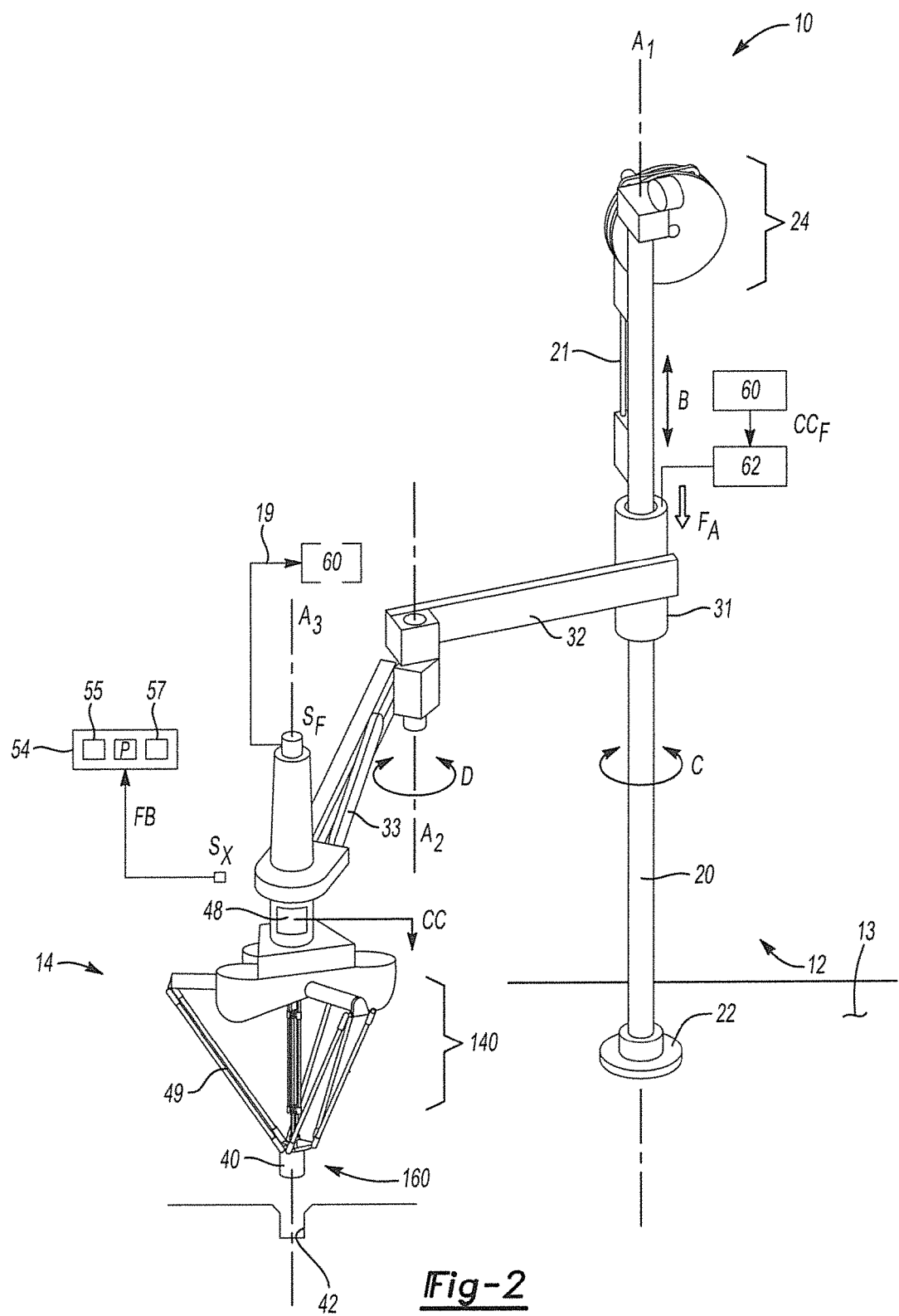
FIG. 2 is a schematic perspective side view illustration of an alternative embodiment of the extended-reach assist device shown in FIG. 1 in which a compliant end-effector includes an actively-compliant mechanism.
Figure 3:
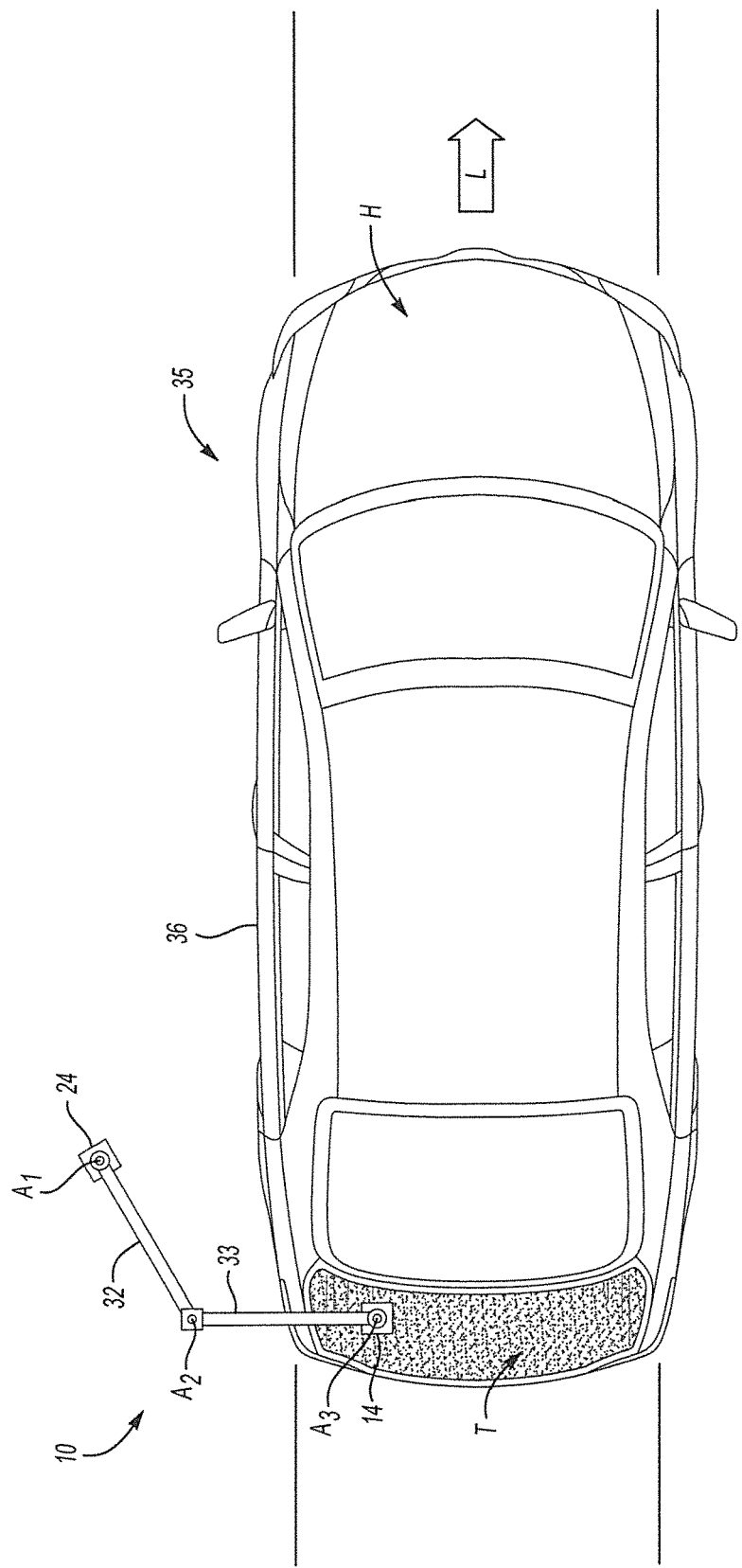
FIG. 3 is a schematic plan view illustration of an example vehicle application of the extended-reach assist devices shown in FIGS. 1 and 2.

Referring to the drawings, wherein like reference numbers refer to like components, an extended-reach assist device 10 is shown schematically in FIGS. 1-3. The assist device 10 may be used to facilitate assembly tasks in a variety of applications, including assembly operations in which access to a component or installation area is limited, or which otherwise requires an operator to reach beyond the operator's normal range of motion. As disclosed herein, the assist device 10 may also be used to help error-proof the assembly process by measuring signatures during the assembly process and providing feedback to the operator as to the successful completion of the assembly task.

In particular, the assist device 10 includes a serially-connected, articulated base mechanism 12 and compliant end-effector 14, the weight of which may be supported by the articulated base mechanism 12. The articulated base mechanism 12 provides at least one passive control degree of freedom (DOF), such as links in the form of an example base arm segment 32 and one or more interconnected additional arm segments 33. The compliant end-effector 14, which is connected to the articulated base mechanism 12, is "compliant" to the extent that the compliant end-effector 14 has one or more control DOF collectively configured to react to forces on the end-effector 14 from an external object or surface when an operator is performing an assembly task.

As used herein, the terms "active compliance" and "active DOF" describe actively-controlled joints, e.g., via measured and controlled forces or torques from a motor, linear actuator, or other suitable joint actuator. As such, the control functionality of actively-compliant joints is programmed by an operator into a control module or resident control chip for executing process-specific control functions. Likewise, "passive compliance" and "passive DOF" refer to built-in structural compliance of the end-effector 14, e.g., force or torque limits enforced by springs, dampers, or other passive mechanisms. For the purposes of the present disclosure, therefore, "active" is used synonymously with programmed actuators responsive to sensor input and control feedback, and "passive" is used synonymously with the compliant response of any DOF lacking such active controls.

As noted above, the extended-reach assist device 10 is intended to assist a human operator in the performance of an assembly task, particularly any task requiring some level of finger and/or hand manipulation that may also require the operator to bend and/or reach. By using the assist device 10, gross positioning of the end-effector 14 and other non-dexterous movements required by the assembly task are conducted by the operator with passive assistance by the assist device 10. Fine movements are performed via the compliant end-effector 14 in a manner that is dependent on the particular design of the end-effector 14.

The articulated base mechanism 12 may include a link in the form of an elongated member 20 having a first axis $A_1$. The articulated base mechanism 12, which may be variously embodied as a cylindrical pole as shown, a rail, or a beam, may be mounted to a stationary surface 13 or other stationary structure forming a suitable reaction surface to forces applied to the assist device 10. The elongated member 20 includes ends $E_1$ and $E_2$. End $E_1$ may be attached to a flange 22, which in turn can be bolted or fastened to the surface 13. End $E_2$ may be attached to a positioning device 24, for instance a suitable weight support system such as a weighted counterbalance system, or via springs or pneumatics.

The base arm segment 32 has first and second distal ends 37 and 39, respectively. The first distal end 37 of the base arm segment 32 is passively translatable along the first axis $A_1$, i.e., a longitudinal axis of the elongated member 20, as indicated by double-headed arrow B. The first distal end 37 is also passively rotatable about the first axis $A_1$ as indicated by double-headed arrow C. For instance, the base arm segment 32 may be connected to or formed integrally with a cylindrical sleeve 31 that circumscribes and engages the elongated member 20, e.g., via clamps or splines. The cylindrical sleeve 31 may be connected to the positioning device 24, e.g., via a cable 21. Thus, when an operator lifts up or pushes down on the base arm segment 32, the positioning device 24 holds or maintains a position of the first distal end 37 of the base arm segment 32 with respect to the first axis $A_1$.

The additional arm segment 33, which has a distal end 34, is rotatably connected to the second distal end 39 of the base arm segment 32, and thus is rotatable about a second axis $A_2$ that is generally parallel to the first axis $A_1$. Rotation about the second axis $A_2$ is indicated in FIGS. 1 and 2 by double-headed arrow D. The compliant end-effector 14 is positioned at the distal end 34 of the additional arm segment 33 as shown, e.g., clamped. As shown in phantom, an optional lever 50 may be attached to the additional arm segment 33 to facilitate positioning of the additional arm segment 33 and the base arm segment 32. Collectively, the articulated base mechanism 12, the base arm segment 32, and the additional arm segment 33 provide at least three passive degrees of freedom defining the gross or coarse motion of the compliant end-effector 14. Dexterous motion is performed by operation of the compliant end-effector 14 based on the intended design of the compliant end-effector 14.

The compliant end-effector 14 may optionally include a bracing device 45, shown schematically in FIG. 1 for illustrative simplicity but which is equally applicable to FIG. 2. The bracing device 45 can be any structural beams, rails, clamps, or other suitable structure that allows the assist device 10 to brace itself with respect to a component or external surface on which an insertion or other task is to be performed, for instance the surface 41 of FIGS. 1 and 2. Using this approach, insertion or operation forces do not have to pass through the assist device 10. This in turn results in a lighter, more portable, and ultimately more effective assist device 10. Additionally, in the context of force augmentation discussed below, it is expected that the forces applied to the end-effector 14, e.g., insertion forces and/or manual torque, can be significant. Therefore, bracing of the end-effector 14 to the component or surface on which the task is being performed can help optimize the design and effectiveness of the assist device 10. Bracing of the end-effector 14 also leads to a more stable control situation when force amplification between the operator and the end-effector 14 is taking place.

In the embodiment of FIG. 1, the compliant end-effector 14 may be configured to produce a remote center of compliance. As is well known in the art, the concept of a remote center of compliance refers to a point at which linear and angular stiffness is decoupled. Such compliance can facilitate certain tasks, such as placement and insertion of a component 40 such as a peg, rivet, or dowel, into an opening 42 of the surface 41, by effectively changing the motion from one of pushing, which can result in jamming, to one of pulling. Therefore, the end-effector 14 may include any device having such a remote center of compliance and a gripper 16 or other structure suitable for grasping the component 40.

Referring briefly to FIG. 2, the compliant end-effector 14 of FIG. 1 in the alternative could be constructed as a robotic mechanism in the form of an active end-effector 140, e.g., a parallel robot mechanism as shown, or alternatively as a serial robotic mechanism. As is known in the art, a parallel robot is connected to a base through two or more interconnected actuated or passive links, shown schematically at 49 in FIG. 2. Some of the joints may be actively driven, and may include universal or planar joints providing additional control degrees of freedom. Example parallel robot mechanisms are the 6-axis Stewart platform or Delta robot mechanisms using multiple parallelogram linkages, which may restrict movement of a gripper 160 to pure translation, i.e., with no rotation, or which may allow rotation and translation of the gripper 160.

A programmable control module 48, such as a control chip or other controller, is operable for transmitting control signals (arrow CC) to the actuated or passive links 49, and may reside on or in proximity to the end-effector 140. Thus, the end-effector 140 can be programmed to replicate the desired behavior or level of compliance in executing the dexterous portions of the assembly task. Such an actuated end-effector 140 would sense forces and joint positions and send the sensed data to the control module 48, where resident control algorithms embodied by computer-readable instructions, when executed by the control module 48, would determine the desired compliant behavior, and accordingly control the required actuation.

The extended-reach assist device 10 of FIGS. 1 and 2 may be optionally equipped with sensors, including for instance a force sensor $S_F$. The force sensor $S_F$, which may be positioned on an axis $A_3$ that is parallel to the axes $A_1$ and $A_2$, is utilized in force augmentation control. For example, the force sensor $S_F$ may be positioned at an appropriate position on or near the compliant end-effector 14 or 140, with a measured force (arrow 19) transmitted to a controller 60 in communication with a force augmentation mechanism 62, e.g., an actively-controlled actuator. The controller 60 may be programmed with a calibrated equation or lookup tables to be operable to output a force command (arrow $CC_F$) to the mechanism 62 using the measured force (arrow 19). In response to the force command (arrow $CC_F$), the mechanism 62 may apply an augmenting force (arrow $F_A$), e.g., along the first axis $A_1$ to the cylindrical sleeve 31, so as to augment or assist any force applied to the compliant end-effector 14 or 140 by the operator. The mechanism 62 and point of application of the augmenting force (arrow $F_A$) may vary with the design, and whether or not the bracing device noted above is used anywhere in the assist device 10. Alternatively, the mechanism 62 may be a passive mechanism such as a loaded spring. Such an embodiment may forego the use of the force sensor $S_F$.

Additionally or in the alternative, the assist device 10 of FIGS. 1 and 2 may be equipped with a feedback signature sensor Sx and an indicator device 54. The signature sensor Sx is operable for detecting a tactile, visual, audio, and/or other signature providing feedback indicative of a successful completion of the dexterous task, and for generating a feedback signal (arrow FB) to the indicator device 54 when the successful completion of the dexterous task is detected. As part of this approach, the indicator device 54 may include signature logic 55, a processor P, and an indicator 57 such as a lamp or a speaker. The signature sensor Sx may be, by way of example, a vibration sensor, an acoustic sensor, a displacement sensor, a force sensor, a camera, and/or any other suitable sensor. The signature logic 55 may include any comparative basis for the received signature, such as a library of validated signatures, a neural network, programmed thresholds, machine learning techniques, and the like. Thus, when an operator successfully installs the component 40, the signature sensor Sx detects a signature corresponding to this installation and relays the same to the processor P, which in turns activates the indicator 57 signalling the successful completion of the task to the operator. In this manner, error-proofing during installation or assembly is made possible.

FIG. 3 depicts a non-limiting example assembly line application of the extended-reach assist device 10 used in the assembly of a system 35. While the system 35 is shown as an example automobile, the assist device 10 may be used to assemble other vehicles such as aircraft, boats and other watercraft, trains, and spacecraft, as well as non-vehicular systems in various industries in which an operator requires force augmentation, error-proofing verification, and/or general assistance in the performance of an assembly task. Example non-vehicular processes benefitting from use of the assist device 10 may include appliance, furniture, toy, power equipment, and other manufacturing processes.

The system 35 of whatever configuration has a body 36 defining, in the example vehicle embodiment of FIG. 3, a hood H and a trunk T. The system 35 may move during assembly along a conveyor in the direction of arrow L. The assist device 10 may be positioned adjacent to the assembly line within range of the body 36. A human operator (not shown), who might ordinarily be required to bend and reach down or up into the open trunk T or other compartment to install a fastener or do another work task, instead manually positions the arm segments 32 and 33 as needed such that the compliant end-effector 14 of FIG. 1 or the end-effector 140 of FIG. 2 is located over a target area for the task, e.g., above the example hole 42 of FIGS. 1 and 2. The body 36 may be used as a surface against which the bracing device 45 acts for improved stability of force augmentation as explained above.

As will be appreciated by one of ordinary skill in the art, the assist device 10 described above may be used as part of an error-proofing methodology, with or without force augmentation of the type described above. For instance, the feedback sensor Sx may be used to detect a signature indicative of successful completion of the task, or of a discrete step thereof, and to communicate the successful completion to the controller 60. The controller 60, using the signature logic 55 and the processor P, may generate a feedback signal (arrow FB) to the indicator device 54 as part of the method to cause the indicator device 54 to signal the successful completion to the operator, and possibly a quality control system or other device.

Optionally as part of the method, the controller 60 may receive the measured the force (arrow 19) and output a force command (arrow $CC_F$) to the mechanism 62 to cause the mechanism 62 to apply an augmenting force (arrow $F_A$) to augment or assist any force applied to the compliant end-effector 14 or 140 by the operator. Other embodiments, as explained above, may use a mechanism 62 that is passive such as a loaded spring, and so the present approach is not limited to active force augmentation. In this manner, error proofing may be applied to the automotive, airline, watercraft, or other vehicular assembly processes, as well as other industries.

The detailed description and drawings are supportive and descriptive of the disclosure, but the scope of the disclosure is defined solely by the claims. While some of the best modes and other embodiments for carrying out the disclosure have been described in detail, various alternative designs and embodiments exist for practicing the disclosure as defined in the appended claims.

The invention claimed is:

1. An extended-reach assist device for assisting an operator in performing an assembly task, the assist device comprising:
    an articulated base mechanism mounted to a stationary external surface, wherein the articulated base mechanism provides the assist device with at least one passive degree of freedom, and wherein the articulated base mechanism is configured to be manually positioned and manipulated by the operator during performance of the assembly task; and
    a compliant end-effector that is connected to the articulated base mechanism, wherein the compliant end-effector is configured to provide the assist device with one or more additional degrees of freedom, and wherein the additional degrees of freedom are collectively configured to react to contact forces acting on the end-effector during the performing of the assembly task, such that the compliant end-effector is configured to move with at least three passive degrees of freedom.

2. The assist device of claim 1, wherein a weight of the end-effector is supported by the articulated base mechanism.

3. The assist device of claim 1, wherein the end-effector is configured to produce a remote center of compliance.

4. The assist device of claim 1, wherein the additional degrees of freedom provided by the compliant end-effector include one or more active degrees of freedom, and the end-effector is an actively-controlled serial or parallel robot mechanism responsive to control signals from a control module to provide the one or more active degrees of freedom.

5. The assist device of claim 1, further comprising a force augmentation mechanism operable for actively or passively augmenting a force applied by the operator to the compliant end-effector.

6. The assist device of claim 1, further comprising at least one sensor operable for detecting a signature indicative of a successful completion of the assembly task, and an indicator device in communication with the at least one sensor that is operable for indicating the successful completion of the assembly task.

7. The assist device of claim 6, wherein the at least one sensor includes a tactile sensor.

8. The assist device of claim 6, wherein the at least one sensor includes an acoustic sensor.

9. The assist device of claim 6, wherein the at least one sensor includes a camera.

10. The assist device of claim 1, wherein the articulated base mechanism includes a weight support system that maintains a relative position of the base mechanism.

11. An extended-reach assist device for assisting an operator in performing an assembly task, the assist device comprising:
    an articulated base mechanism providing one or more passive degrees of freedom, and having:
        a link having a first axis;
        a first arm segment having first and second distal ends, wherein the first distal end of the first arm segment is rotatable and translatable with respect to the first axis; and
        a second arm segment connected to the second distal end of the first arm segment, and rotatable about a second axis that is parallel to the first axis, the first and second arm segments are configured to be manually positioned and manipulated by the operator when performing the assembly task;
    a compliant end-effector positioned at a distal end of the second arm segment and configured to provide one or more active and additional passive degrees of freedom, such that the compliant end-effector is configured to move with at least three passive degrees of freedom, and wherein the compliant end-effector is configured to produce a remote center of compliance;
    a signature sensor operable for detecting a signature indicative of a successful completion of the assembly task; and
    an indicator device in communication with the sensor that is operable for indicating the successful completion of the assembly task.

12. The assist device of claim 11, further comprising:
    a force sensor operable for detecting an applied force to the compliant end-effector; and
    a force augmentation mechanism in communication with the force sensor that is operable for actively augmenting the detected applied force.

13. The assist device of claim 11, further comprising: a force augmentation mechanism that is operable for passively augmenting the detected applied force.

14. The assist device of claim 11, wherein the signature sensor includes an acoustic sensor.

15. The assist device of claim 11, wherein the signature sensor includes a tactile sensor.

16. The assist device of claim 11, wherein the signature sensor includes a camera.

17. The assist device of claim 11, wherein the end-effector is an actively-controlled serial or parallel robot mechanism responsive to control signals from a control module to provide the one or more active degrees of freedom.

18. The assist device of claim 11, wherein the articulated base mechanism includes a weight support system that maintains a relative position of the base mechanism.

19. An extended-reach assist device for an assembly task, comprising:
    an articulated base mechanism providing one or more passive degrees of freedom, and having:
        a link having a first axis;
        a first arm segment having first and second distal ends, wherein the first distal end of the first arm segment is rotatable and translatable with respect to the first axis; and a second arm segment connected to the second distal end of the first arm segment, and rotatable about a second axis that is parallel to the first axis;

a compliant end-effector positioned at a distal end of one of the additional arm segment and configured to produce a remote center of compliance, wherein the end-effector is a rotatable and translatable robotic mechanism providing one or more active or additional passive degrees of freedom;

a force sensor operable for detecting an applied force to the compliant end-effector;

a force augmentation actuator operable for actively augmenting the detected applied force;

a signature sensor operable for detecting a signature indicative of a successful completion of the dexterous assembly task; and an indicator device in communication with the signature sensor that is operable for indicating the successful completion of the assembly task.

* * * * *